(12) United States Patent
Du et al.

(10) Patent No.: US 8,767,614 B2
(45) Date of Patent: Jul. 1, 2014

(54) REPORTING BUFFERING INFORMATION

(75) Inventors: Lei Du, Beijing (CN); Zhu Yan Zhao, Beijing (CN); Min Huang, Beijing (CN); Wei Hua Zhou, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 46 days.

(21) Appl. No.: 13/516,554

(22) PCT Filed: Dec. 17, 2009

(86) PCT No.: PCT/CN2009/075663
§ 371 (c)(1),
(2), (4) Date: Jun. 15, 2012

(87) PCT Pub. No.: WO2011/072447
PCT Pub. Date: Jun. 23, 2011

(65) Prior Publication Data
US 2012/0250605 A1    Oct. 4, 2012

(51) Int. Cl.
*H04B 7/14* (2006.01)
*H04W 4/00* (2009.01)

(52) U.S. Cl.
USPC .............................. 370/315; 370/328; 455/7

(58) Field of Classification Search
CPC ......................... H04B 7/15528; H04B 7/15542
See application file for complete search history.

(56) References Cited

U.S. PATENT DOCUMENTS

| | | | |
|---|---|---|---|
| 7,092,670 B2* | 8/2006 | Tanaka et al. | 455/7 |
| 7,590,064 B1* | 9/2009 | Zhang et al. | 370/235 |
| 7,920,500 B2* | 4/2011 | Kobayashi et al. | 370/315 |
| 2009/0296626 A1* | 12/2009 | Hottinen et al. | 370/315 |
| 2010/0034148 A1* | 2/2010 | Zhang et al. | 370/328 |
| 2010/0302946 A1* | 12/2010 | Yang et al. | 370/235 |
| 2011/0090793 A1* | 4/2011 | Halfmann et al. | 370/235 |
| 2011/0222428 A1* | 9/2011 | Charbit et al. | 370/252 |
| 2012/0033606 A1* | 2/2012 | Chun et al. | 370/315 |
| 2012/0082088 A1* | 4/2012 | Dalsgaard et al. | 370/315 |
| 2012/0127863 A1* | 5/2012 | Yi et al. | 370/235 |
| 2013/0235753 A1* | 9/2013 | Kovacs et al. | 370/252 |

FOREIGN PATENT DOCUMENTS

| | | |
|---|---|---|
| CN | 101116308 A | 1/2008 |
| CN | 101557581 A | 10/2009 |
| WO | WO 2009/088334 A1 | 7/2009 |
| WO | WO2009/095814 A1 | 8/2009 |

* cited by examiner

*Primary Examiner* — Clemence Han
(74) *Attorney, Agent, or Firm* — Harrington & Smith (57) ABSTRACT

A buffer information report can be sent to a system station from a node for relaying communications between at least one user station and the system station. The report is generated based on a report format used for uplink reporting by a user station. An indication is also sent to the system station that the node for relaying has different buffering capabilities than the user station. At the system station the buffering capabilities of the node for relaying can be determined based on the buffer information report and the indication. Communications between the system station and the node for relaying can then be controlled accordingly.

24 Claims, 4 Drawing Sheets

REPORTING BUFFERING INFORMATION

The invention relates to reporting in a communication system, and more particularly to reporting of buffering information in a communication system.

A communication system can be seen as a facility that enables communication sessions between two or more entities such as user devices, base stations and/or other stations. A communication system and compatible communication devices typically operate in accordance with a given standard or specification which sets out what the various entities associated with the system are permitted to do and how that should be achieved. Communication protocols and/or parameters which shall be used for the connection are also typically defined. For example, the manner how the communication system can be accessed and how communication shall be implemented between various communicating devices, the elements of the communication network and/or other associated nodes is typically based on predefined communication protocols.

A user can access a communication system by means of an appropriate user (communication) device. A user device is often referred to as user equipment (UE). Users can be provided with numerous services via their communication devices. Non-limiting examples of possible services include two-way or multi-way calls, data communication or multimedia services or simply an access to a data communication network system, such as the Internet.

In a wireless communication system at least a part of the communication between at least two communicating devices, or wireless stations, occurs over a wireless link. Examples of wireless systems include public land mobile networks (PLMN), satellite based communication systems and different wireless local networks, for example wireless local area networks (WLAN). The wireless systems can be divided into cells, such systems being often referred to as cellular systems.

A user device and other stations are provided with an appropriate signal receiving and transmitting apparatus for enabling communications with other stations. In wireless systems a user communication device can communicate with for example a base station of an access network and/or another communication device such as another user equipment.

$3^{rd}$ Generation Partnership Project (3GPP) is standardizing an architecture that is known as the long-term evolution (LTE) of the Universal Mobile Telecommunications System (UMTS) radio-access technology. The aim is to achieve, inter alia, reduced latency, higher user data rates, improved system capacity and coverage, and reduced cost for the operator. A further development of the LTE is referred to herein as LTE-Advanced. The LTE-Advanced aims to provide further enhanced services by means of even higher data rate and lower latency with reduced cost. The various development stages of the 3GPP LTE specifications are referred to as releases. Backward compatibility of LTE-Advanced with earlier versions of the LTE would be desired.

In particular in the initial network development phase building of cost-effective coverage may be desired by network operators. There are also other reasons for extending the coverage of an access point such as a base station. Relaying has been proposed as a possibility to enlarge the coverage of a base station. Apart from this goal of coverage extension, relaying may also help in provision of high-bit-rate coverage in high shadowing environment, reducing average radio-transmission power at the user equipment (UE), thereby leading to improved battery life. More effective throughput may also be achieved, for example because of increased cell-edge capacity, better balancing of cell load and enhanced overall performance and deployment cost of radio access networks (RAN). Already for these reasons relaying is considered as a potential feature of the LTE-A, and it can be contemplated that for future LTE standard releases, releases 9 and upwards, relay nodes (RNs) are provided.

The design of non-transparent relay concept with backward-compatibility with the existing LTE compatible devices, for example with devices known as LTE release 8 compatible equipment would be desired. It may also be desired to keep the software and even hardware updates as small as practically possible at the network side.

Relaying between stations can be provided by entities referred to as relay stations (RSs) or relay nodes (RNs). The relay nodes can be fixed, for example other base stations, or mobile, for example mounted on a high-speed train. In some systems the relaying nodes or stations may be provided by opportunistically available user equipments/mobile terminals that are not as such a part of the communication network. A relay node (RN) can be wirelessly connected to the communication system, typically to a station connected to a radio-access network. Such a station is often referred to as a donor station or donor cell. The donor station provides resources for wireless backhauling, or a backhaul link, for the relay.

Reporting of information regarding the buffers status of the user equipment has been proposed. For example, LTE provides a mechanism known as buffer status reporting for providing the serving base station, and more particularly the serving LTE enhanced NodeB (eNB), with information about the amount of data available for transmission in the uplink buffers of the user equipment (Un). The particular reports generated and sent in the uplink to the serving base station by the user equipment are called buffer status reports (BSR). The serving base station is able to support quality of service (QoS) aware packet scheduling over the uplink based on buffering information contained in the reports. This is so because the serving station can take the buffer status at the respective user equipments into consideration. The information assists in avoiding buffer overflows and unnecessary dropping of data connections due to unavailable uplink grants.

More particularly, the buffer status report (BSR) is provided from the user equipment to the serving eNB via medium access control (MAC) signaling by means of an appropriate buffer status report (BSR) MAC control element. The BSR MAC control element can consist of a short BSR or a truncated BSR format or a long BSR format. All the formats include a buffer size field which identifies the total amount of data available across all logical channels of a logical channel group (LCG) after the MAC protocol data unit (EDU) has been built. The currently defined length of the buffer size field of the buffer status report is 6 bits. The values of the field present the number of bytes in the buffer of the user equipment, and range from 0 to 150000 bytes.

In a relaying scenario where the relay node (RN) is provided by a user equipment it is possible that the user equipment acting as a relay node reports the buffer status thereof in the same manner as user equipments report the status in the LTE when no relaying is used. This helps the donor eNB to schedule proper uplink backhaul resources for the relay node as well as the uplink flow control. However, a relay node can also simultaneously serve multiple user equipments and thus a considerable volume of data may aggregate at the relay node. Because of this the buffer capacity at the relay nodes should be higher than that at the individual user equipments. Also, the peak data rate on the backhaul links can be higher than on the access links. Thus the serving or donor eNB should not treat relay nodes and user equipment in the same way as the buffer of a relay node may be considerably larger and thus far from overflow compared to the buffer of the user equipment. Moreover, in the current reporting structure, if the buffer size of a relay node exceeds 150000 bytes, all buffer status reports (BSR) thereof fall into the maximum range, i.e. the report would indicate a buffer size that is higher than 150000 bytes. This may not appropriately present the true buffer status at the relay node.

Another issue relates to flow control. The current proposals focus on downlink (DL) flow control by indicating additional downlink buffer-related information from user equipment to the serving eNB. The current proposals consider the buffer status reports also as a solution for the uplink (UL) flow control. However, the inventors have recognized that the above discussed limitation in view of buffer size information may have an impact in relation of uplink flow control.

It is noted that the above discussed issues are not limited to any particular communication environment, but may occur in any appropriate communication system where relaying may be provided.

Embodiments of the invention aim to address one or several of the above issues.

In accordance with an embodiment there is provided a method comprising sending a buffer information report to a system station from a node for relaying communications between at least one user station and the system station, the report being generated based on a report format used for uplink reporting by a user station and sending an indication to the system station that the node for relaying has different buffering capabilities than the user station.

In accordance with another embodiment there is provided a method comprising receiving a buffer information report from a node for relaying communications between at least one user station and a system station, the report being generated based on a report format used for uplink reporting by a user station, receiving an indication that the node for relaying has different buffering capabilities than the user station, determining the buffering capabilities of the node for relaying based on the buffer information report and the indication, and controlling communications between the system station and the node for relaying accordingly.

In accordance with another embodiment there is provided an apparatus, comprising means for causing sending of a buffer information report to a system station from a node for relaying communications between at least one user station and the system station, the report being generated based on a report format used for uplink reporting by a user station, and means for causing sending of an indication to the system station that the node for relaying has different buffering capabilities than the user station.

In accordance with another embodiment there is provided an apparatus comprising means for receiving a buffer information report from a node for relaying communications between at least one user station and a system station, the report being generated based on a report format used for uplink reporting by a user station, and control means for processing an indication that the node for relaying has different buffering capabilities than the user station, for determining the buffering capabilities of the node for relaying based on the received buffer information report and the indication, and for controlling communications between the system station and the node for relaying accordingly.

In accordance with a yet another embodiment there is provided a buffer information message for reporting buffer information to a system station from a node for relaying communications between at least one user station and the system station, the buffer information message comprising a buffer status report for uplink reporting by a user station and an indication that the node for relaying has different buffering capabilities than the user station.

In accordance with a more detailed embodiment the indication can be based on the number of user stations served by the node for relaying. The indication may comprise the number of user stations served by the node for relaying. The indication may comprise an indication that the buffer size of the node for relaying is extended from that of the user equipment and information of the size of the extension.

The buffer information report may indicate the buffer size of a user equipment and the indication may provide a buffer extension factor, wherein the buffer capabilities of the node for relaying are defined as a function of the buffer size and buffer extension factor. The indication may be based at least partially on the buffer capability of the node for relaying.

The indication may be communicated within the buffer information report. For example, the buffer information report may comprise a buffer status report provided with an information element containing said indication. The buffer status report may comprise an extension including said indication. The indication maybe provided by increasing the length of the buffer size field of a buffer status report.

Alternatively, said indication may be communicated separately from the buffer information report. The buffer size of the node for relaying mat then be determined by multiplying the buffer size indicated by a buffer status report by separately signalled indication of the number of user stations connected to the node for relaying. Said indication may be communicated in a radio resource control message or an admission control message and the buffer information report may be communicated in a medium access control message.

A computer program comprising program code means adapted to perform the methods may also be provided. In accordance with further embodiments apparatus and/or computer program product that can be embodied on a computer readable medium for providing at least one of the herein described methods is provided.

Various other aspects and further embodiments are described in the following detailed description and in the attached claims.

The invention will now be described in further detail, by way of example only, with reference to the following examples and accompanying drawings, in which.

In the following certain exemplifying embodiments are explained with reference to wireless or mobile communication systems serving mobile communication devices. Before explaining in detail the certain exemplifying embodiments, certain general principles of a wireless communication system and the elements thereof are briefly explained with reference to FIGS. 1 to 3 to assist in understanding the herein described embodiments.

In a wireless system a user can be provided with a station such as a user equipment or device 1 that can be used for accessing various services and/or applications. The access can be provided via an access interface between the user devices 1 and an appropriate wireless access point. An appropriate user device or station 1 may be provided by any device capable of sending and receiving radio signals. Non-limiting examples include a mobile station (MS), a portable computer provided with a wireless interface card or other wireless interface facility, personal data assistant (PDA) provided with wireless communication capabilities, or any combinations of these or the like. A wireless mobile communication device is often referred to as a user equipment (UE).

Figure 1:
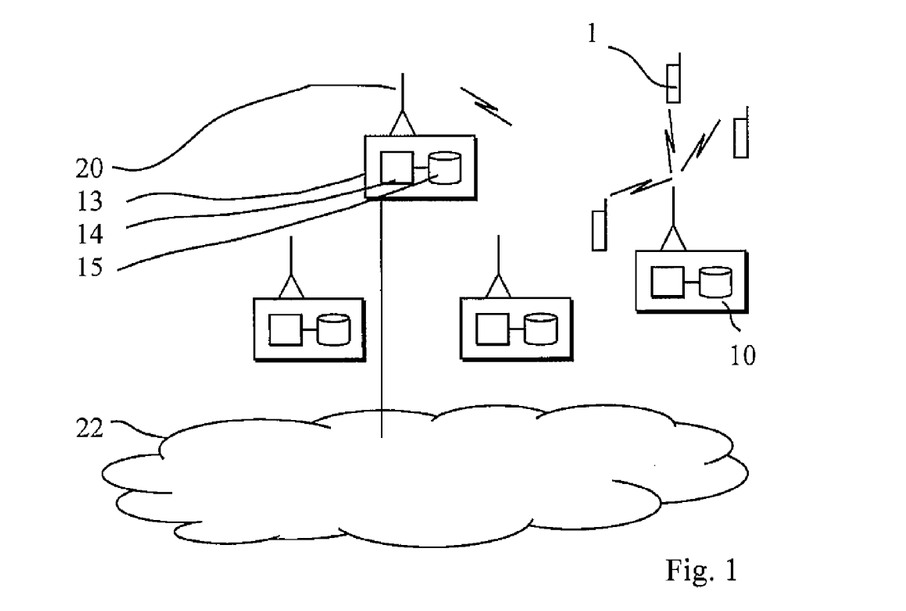
FIG. 1 shows an example of a communication system in which the embodiments of the invention may be implemented.

The communication devices 1 of FIG. 1 may be used for voice and video calls, for accessing service applications provided via a data network. Each device 1 may receive signals via an appropriate radio receiver of the device (not shown for clarity). The receiver maybe provided for example by means of a radio part and associated antenna arrangement. The antenna arrangement may be arranged internally or externally to the mobile device. A mobile device is also typically provided with at least one data processing entity, at least one memory and other possible components for use in tasks it is designed to perform. A relevant memory facility in this context is the buffering capability. The data processing, storage and other entities can be provided on an appropriate circuit board and/or in chipsets. Each mobile device 1 may have one or more radio channels open at the same time and may receive signals from more than one base station and/or other communication device.

The wireless user devices can access the communication system based on various access techniques, such as code division multiple access (CDMA), or wideband CDMA (WCDMA), the latter technique being used by communication systems based on the third Generation Partnership Project (3GPP) specifications. Other examples include time division multiple access (TDMA), frequency division multiple access (FDMA), space division multiple access (SDMA) and so on. In a wireless system a network entity such as abase station provides an access node for communication devices. Other non-limiting examples of appropriate access nodes are a base station of a cellular system, a base station of a wireless local area network (WLAN) and/or WiMax (Worldwide Interoperability for Microwave Access). A non-limiting example of mobile architectures where the herein described principles may be applied is known as the Evolved Universal Terrestrial Radio Access Network (E-UTRAN) wherein base stations are provided by means of enhanced NodeBs (eNBs). The eNBs may provide E-UTRAN features such as user plane Radio Link Control/Medium Access Control/Physical layer protocol (RLC/MAC/PHY) and control plane Radio Resource Control (RRC) protocol terminations towards the user devices.

Figure 2:
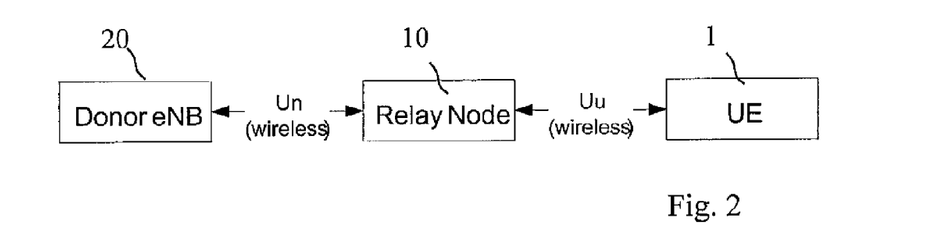
FIG. 2 illustrates schematically the relation between a user station, a node for relaying and a system station.

In the FIG. 1 example the base stations 10 and 20 are each configured to provide radio coverage area or a cell. The base stations can provide one or more cells. In the example of FIGS. 1 and 2 base station 20 provides the serving station or a donor station of the communication system and base station 10 provides a relay node. The relevance of the relation between a donor station and nodes for relaying will be discussed in more detail later in this description.

A base station is typically controlled by at least one appropriate controller entity so as to enable operation thereof and management of mobile user devices in communication with the base station. The controller entity is typically provided with memory capacity and at least one data processor. The control entity can be interconnected with other control entities. In FIG. 1 the controller is shown to be provided by block 13 comprising at last one processor 14 and at least one memory 15. However, it shall be understood that the control functions may be provided differently from this example. For example, the control functions may be distributed between a plurality of controller units.

Figure 3:
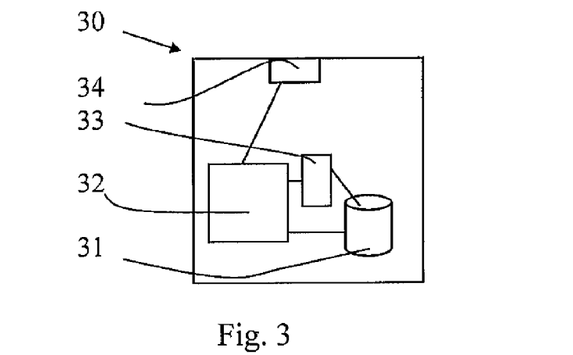
FIG. 3 shows an example of a controller for a station.

FIG. 3 shows an example of a controller apparatus 30 for a relay node comprising at least one memory 31, at least one data processing unit 32 and an input/output interface 34. The control apparatus further comprises a buffering entity 33. The controller may be configured to execute an appropriate software code to provide the desired control functionality.

Although not shown, a gateway function between the access systems, the core network and/or another network such as the packet data network may be provided by means of appropriate gateway nodes. Therefore, regardless of the gateway arrangement, the serving base station 20 is shown to be connected to a data network 22.

In FIG. 1 at least one of the base stations 10 can act as a relay node between the user equipments 1 and the serving base station 20 of the communication system. Communications between the user equipments 1 and the base station/relay node 10 can be provided by a duplex link (see also FIG. 2). Communications between the base station/relay node 10 and the base station 20 can also be provided by means of a duplex link.

Considering now the exemplifying relay nodes of the 3GPP. Up to now, the 3GPP has only defined a "type 1" relay node (RN). A type 1 relay node is an inband relaying node that has a separate physical cell identity (ID), supports hybrid automatic retransmission request (HARQ) feedback mechanism and is backward compatible to Release 8 (Rel8) communication devices. The definition for the nodes and the interfaces as shown in FIG. 2 has also been agreed. The interface between the user equipment (UE) 1 and relay node 10 is named as Uu interface and the link is seen as an access link. Considering the backward compatibility requirements, the interface between the user equipment and the relay node can be consistent with the Release 8 interface of the LTE. The link between the relay node 10 and the serving base station, or a donor eNB (DeNB) if the language of the 3GPP LTE is to be used, is considered as a backhaul link. This interface is denoted in the example as an Un interface. The definitions of the backhaul interface are currently still open and are yet to be specified in 3GPP. Nevertheless, the basic principle of backhauling between a relay node and a donor station can be seen from FIG. 2.

The following examples are given with reference to a possible buffer information reporting arrangement for advanced long term evolution (LTE-A) of the 3GPP. In the LTE buffer status reporting procedure can be used in the uplink to provide the serving system eNB 20 with information about the amount of data available for transmission in the uplink buffers (UL) of the user equipments (UE) 1. With this information, the serving eNB can offer improved support for quality of service aware packet scheduling over the uplink, taking into consideration the buffer statuses of the respective user equipments.

In the examples described below with reference to FIGS. 4 to 10 use of a buffer status information reporting capability of a user station in the uplink is utilised by extending the use thereof to the backhaul link between the relay node and the serving base station of the communication system. In the examples the serving base station is provided by eNB 20 and the relay nodes are provided by eNBs 10. In the described embodiments buffer status reports (BSR) and/or any other appropriate metric is used to provide a mechanism for reflecting the buffer size at the relay node and/or the buffer size at user equipments connecting to the relay node. In the examples the relay node can send, for example, an extended BSR (E-BSR) to the donor eNB. The E-BSR can be sent and the buffering information delivered, for example, by means of medium access control control element (MAC CE) and/or radio resource control (RRC) signalling.

Figure 4:
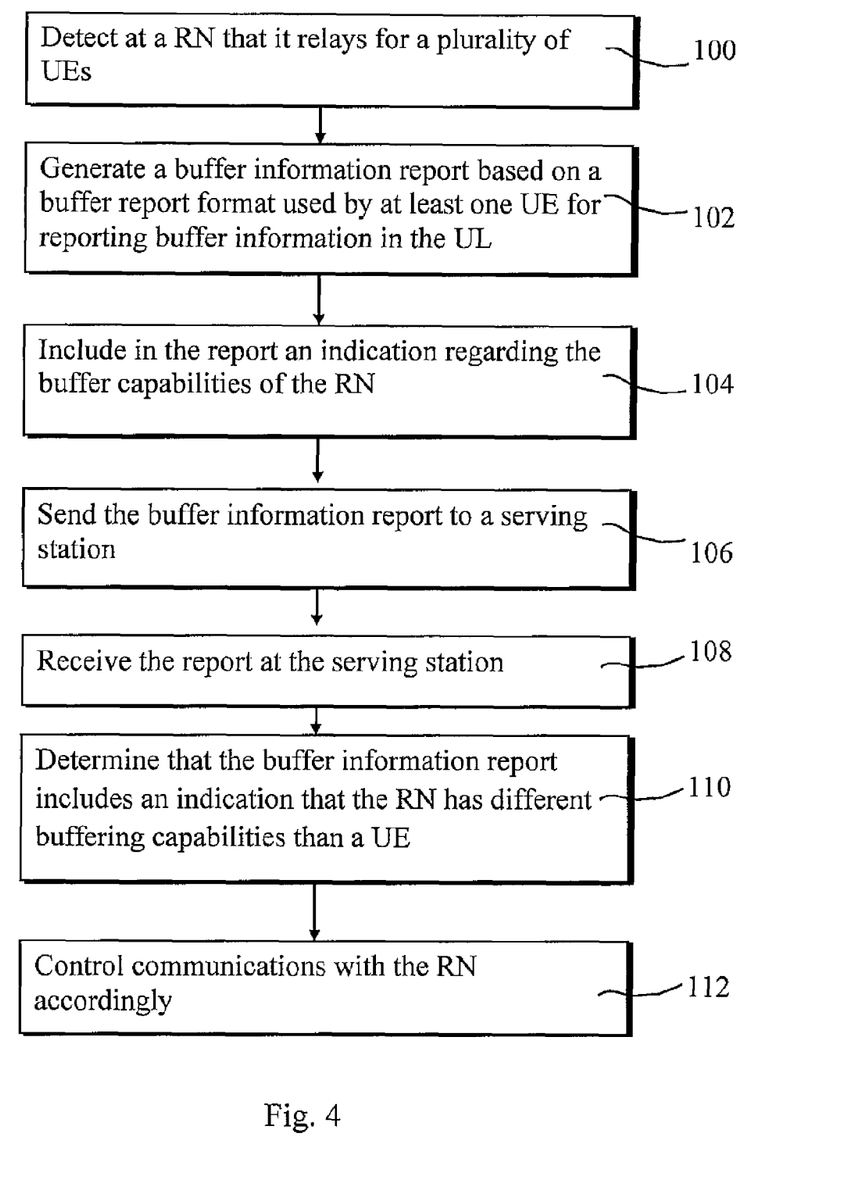
FIG. 4 shows a flow chart for reporting buffer information in accordance with an embodiment.

Operation of the relay node and serving node in accordance with an embodiment is illustrated by the flowchart of FIG. 4. As shown in the flowchart of FIG. 4, the reporting mechanism is extended to cover also the backhaul link such that the greater buffer sizes of the relay nodes can be taken into account.

In the shown embodiment the relay nodes detects at 100 that it is relaying for a plurality of user stations. The relay node then generates at 102 a buffer information report based on a buffer report format used by at least one user station. Whilst the user stations can use this report for reporting their buffer status on an access link, in here the report is used for reporting relay node buffer information in the backhaul uplink. To generate the report the relay node may generate a new report in accordance with the report format typically used by the user stations for uplink reporting, and include information regarding its buffer at 104 to this newly generated report. Alternatively, the relay node can use a report received from a user station on the access link as a base, and add further buffer information relating to its buffering capabilities at 104 to the report before forwarding the report to the backhaul link.

Information that the relay node may include at 104 into the report comprises information regarding the buffer that is maintained at the relay node. It may additionally include or forward buffer status information it has received from the user stations. For example, the relay node can include in the report an indication regarding the buffering capabilities thereof. An example of such indication is an indication that the relay node has different buffering capabilities from what would be the buffer capability of a user station it is serving, and shall therefore be treated differently.

The indication can be given, for example, in the form of an indication of the size of the buffer of the relay node. The size can be indicated in various ways, for example as a multiple of the buffer size of a user station, as a number of user stations served by the relay node, and so on. In the detailed examples below the indication is given by a buffer extension factor.

The relay node then sends at 106 the buffer information report with the buffering information to a serving base station. The serving base station receives the report at 108. It can determine at 110 that the buffer information report includes an indication that the relay node has different buffering capabilities from the buffer capability of a user station. Upon determining of the buffering capabilities of the relay node, the serving base station can make any required computations, for example computations as discussed below in the detailed examples, and control communications with the node for relaying accordingly at 112.

Figure 5:
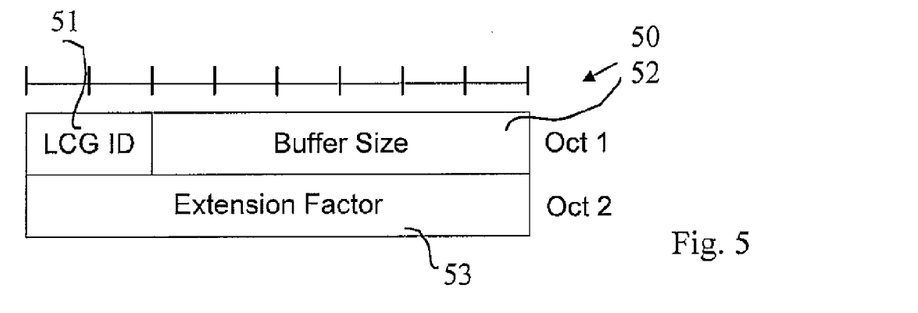
FIGS. 5 to 10 show reports in accordance with certain embodiments.

FIG. 5 shows a more detailed example where the indication is provided by means of an extension factor (EF). The extension factor can be included in a medium access control (MAC) control element (CE) provided by a short buffer status report. The extended buffer status report (E-BSR) 50 comprises a normal buffer status report (BSR) part 52 as used by a user equipment for uplink reporting in octet 1. An indication 53 of buffer extension is included in octet 2. In the example of FIG. 5 the indicator 53 is provided by an extension factor (EF) information element (IE).

The extension factor can be a value that is indicative of how much the buffer size of the relay node shall be extended. For example, the extension factor can be expressed as an integer representing the number of user equipments that are currently connected to the relay node. According to another possibility the factor is decided based on the relay node buffer capability. For example, a table of increased ranges for the buffer capability can be defined, and these can be used for the reporting.

For short or truncated E-BSR 50, the extension factor can be applied to extend the buffer size corresponding to the logical channel group (LCG) as indicated by the Logical Channel Group Identity (LCG ID) 51 in the normal BSR part 52. The extension factor can be defined as an integer number, the number being indicative how much to extend the buffer size.

Figure 6:
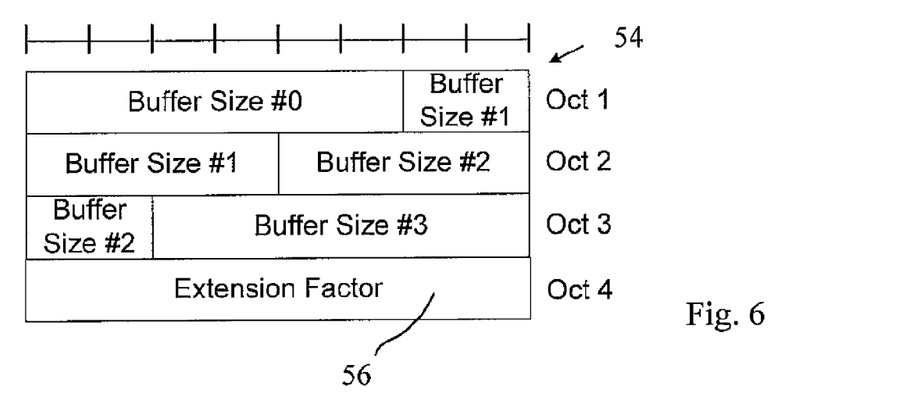

FIG. 6 shows a long extended buffer status report 54 comprising four buffer size fields corresponding to LCG IDs #1 through #4 in octets 1-3. For a long E-BSR 54 shown in FIG. 6, a common extension factor information element 56 in octet 4 can be applied to the buffer sizes corresponding to all logical channel groups (LCGs) in the normal BSR part. Alternatively, different extension factors can be provided to be applied to the different LCGs, respectively.

The serving station, i.e. the donor eNB 20 of FIGS. 1 and 2, then receives the report. The donor eNB detects that the report is an E-BSR, where after it can consider the buffer size as a function of the buffer size indicated in the normal BSR part and the extension factor. For example, the donor eNB can multiply the BSR of part 52 by the extension factor of part 53 in FIG. 5.

Use of an extended BSR can be triggered when it is determined that the extension factor needs to be changed. The relay node can determine this based on its buffer status. In case there is no need for a change in the extension factor it can remain the same as in the previous report. In such instance it is possible to use the normal BSR for reporting, and the donor eNB can calculate the buffer size of the relay node by multiplying the value of the most recent BSR by the previously received extension factor. Thus the most recent extension factor can be used as default until anything else is indicated.

In accordance with a possibility a default extension factor can be used in response to reception of a report indicative that the reporting node is provided with different buffer capabilities from that of the user equipment. The default can be based on averages or estimates of the number of simultaneously served user equipments and so on.

In accordance with an option, an extension factor is always applied to buffer information reports from a relay node. A default extension factor equalling one can be used by the serving station unless another extension factor is indicated by the buffer information report from the relay node.

In accordance with a possibility the relay node and the serving station will use as a default extension factor the number of user equipments connected to the relay node unless nothing else is indicated. An example of such indication is where the relay node includes a weighting factor to indicate to the serving station that a different extension of the buffer size is to be applied.

Figure 7:
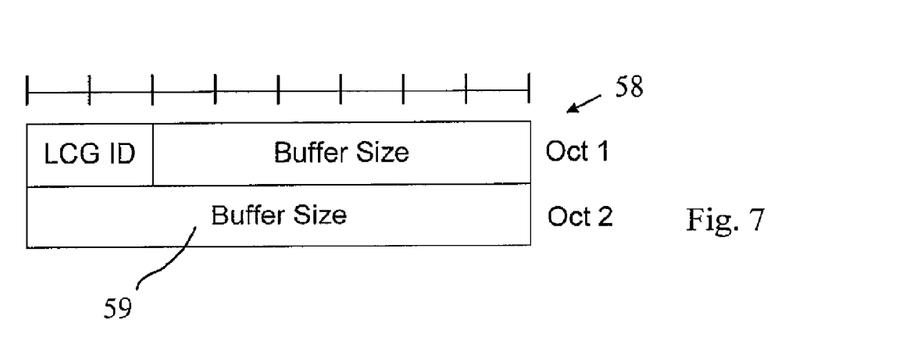

FIG. 7 shows another embodiment wherein an indication of a relay node buffer reporting instead of user equipment reporting is provided by extending the field size of a short or truncated buffer status report. In this embodiment the E-BSR 58 includes the same information elements as a normal BSR but the length of the buffer size field 59 is extended from 6-bit to N-bit (N≥6). The eNB can then detect that the field is longer than it would be in a report received form a user equipment, this indication triggering use of a different buffer size. The different buffer size can then be indicated by the extra bits, or a default value can be used once the indication of a relay node has been detected. For example, a default of 2, 3 or 4 simultaneously communicating user equipments, or any other factor descriptive of an average buffer size of the relay node could be used.

Figure 8:
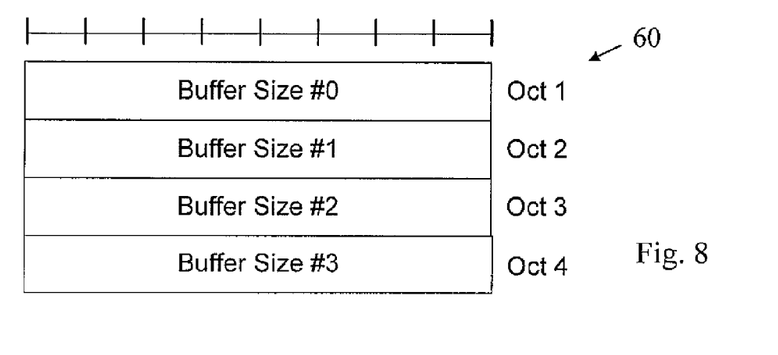

FIG. 8 illustrates an example for use of extended field sizes as an indicator in the case of long buffer status reports for four different fields corresponding to LCG IDs #0 through #3 in octets 1-4. For a long E-BSR 60 shown in FIG. 8, a common extension factor information can be applied to the buffer sizes corresponding to all logical channel groups (LCGs). Alternatively, different extension factors can be provided to be applied to the different LCGs.

Figure 9:
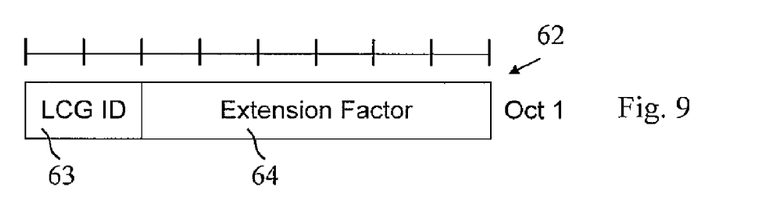
Figure 10:
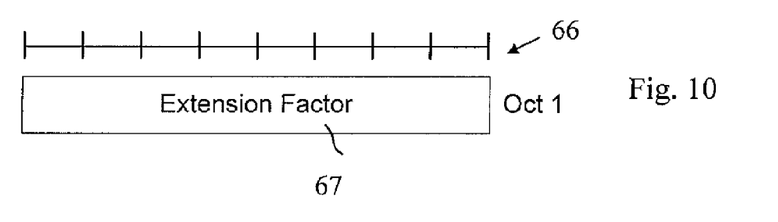

According to yet further examples shown in FIGS. 9 and 10, the extension factor information is transmitted separately in a report message that is based on the normal buffer status report (BSR). E-BSR 62 of FIG. 9 includes the extension factor (EF) information 64 in octet 1 after the LCG ID field 63. In this arrangement the extension factor is common for all members of the logical channel group (LOG). According to a possibility shown in FIG. 10, different extension factors can be provided in field 67 of report 66 for different members of the LCG.

A Logical Channel Identity (LCID) can be assigned dedicatedly for each E-BSR MAC control element. In order to identify the E-BSR MAC control element, a dedicated LCID can be defined, for example, as shown in Table 1 below.

TABLE 1

Values of LCID for UL-SCH

| Index | LCID values |
|---|---|
| 00000 | CCCH |
| 00001-01010 | Identity of the logical channel |
| 01011-11001 | Reserved |
| 11010 | Power Headroom Report |
| 11011 | C-RNTI |
| 11100 | Truncated BSR |
| 11101 | Short BSR |
| 11110 | Long BSR |
| 11111 | Padding |
| Xxxxx | Extended BSR |

Figure 11:
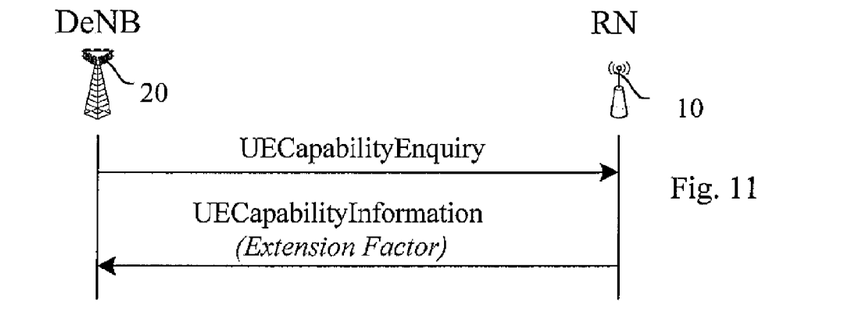
FIG. 11 shows a signalling flow chart for reporting in accordance with an embodiment.

Instead of signalling the extension factor explicitly in buffer status signalling, the extension factor or other indication of the number of user equipments attached to the relay node can be aligned with the number of the user equipments which has been communicated by means of other signalling, for example by means of admission control or radio resource control (RRC) signalling. FIG. 11 shows use of radio resource control (RRC) signalling for communicating the buffer status indication from the relay node to the donor station. Extension of a buffer status report (BSR) can be achieved based on use of RRC signalling for example by including an indication of an extension factor in a message such as a relay node capability information message. The extension factor can be decided, for example, based on the relay node buffer capacity. The exemplifying RRC signalling can make use of a user equipment capability information message as defined by the 3GFF.

In the following transmission, upon reception of the actual buffer status report (BSR) from the relay node 10, the donor eNB 20 calculate the buffer size at relay node 10 as a function of the value presented by the buffer size in the BSR and the extension factor information received in the capability information message. For example, a value of the BSR can be multiplied by the value indicated by an extension factor. An advantage of this embodiment is that it does not necessarily increase MAC signalling overhead after the buffer size is indicated.

The proposed buffer information reporting scheme allows a relay node to indicate its uplink buffer status in a wider range of options and hence to avoid incorrect indication for example in case of out of range of "normal" uplink reporting schemes. This embodiment may also improve the performance of the system. The above described embodiments are also backward compatible to release 8 of the LTE.

The required data processing apparatus and functions of a relay node and a base station apparatus in the system side as well as an appropriate user device may be provided by means of one or more data processors. The above described functions may be provided by separate processors or by an integrated processor. The data processing may be distributed across several data processing modules. A data processor maybe provided by means of, for example, at least one chip. Appropriate memory capacity can also be provided in the relevant nodes. An appropriately adapted computer program code product or products may be used for implementing the embodiments, when loaded on an appropriate data processing apparatus, for example in a processor apparatus 13 associated with the base station 20 shown in FIG. 1 as an example of a serving station and the apparatus of FIG. 3 for a node for relaying. The program code product for providing the operation maybe stored on, provided and embodied by means of an appropriate carrier medium. An appropriate computer program can be embodied on a computer readable record medium. A possibility is to download the program code product via a data network.

The above exemplifying embodiments provide ways how relay nodes can extend use of buffer status reports used by the user stations. The report format can be enhanced for a backhaul link between a relay node and a station of the access system that is actually serving the user station, for example a donor eNB (DeNB). This may be needed because the buffer sizes of the relay nodes can be considerably larger than what is available for buffering in a user station.

It is noted that whilst embodiments have been described in relation to LTE, similar principles can be applied to any other communication system where relaying is employed. Therefore, although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention.

What is claimed is:

1. A method comprising:
   sending a buffer information report to a system station from a node for relaying communications between at least one user station and the system station, the report being generated based on a report format used for uplink reporting by a user station; and
   sending an indication to the system station that the node for relaying has different buffering capabilities than the user station.

2. A method as claimed in claim 1, wherein the indication comprises an indication that the buffer size of the node for relaying is extended from that of the user equipment and information of the size of the extension.

3. A method as claimed claim 1, wherein the buffer information report indicates the buffer size of a user equipment and the indication provides a buffer extension factor, the method comprising defining the buffer capabilities of the node for relaying as a function of the buffer size and buffer extension factor.

4. A method as claimed in claim 1, wherein the buffer information report comprises a medium access control control element.

5. A method as claimed in claim 1, comprising separate signalling of said indication in a radio resource control message or an admission control message and the buffer information report in a medium access control message.

6. An apparatus, comprising:
means for causing sending of a buffer information report to a system station from a node for relaying communications between at least one user station and the system station, the report being generated based on a report format used for uplink reporting by a user station; and
means for causing sending of an indication to the system station that the node for relaying has different buffering capabilities than the user station.

7. A method comprising:
receiving a buffer information report from a node for relaying communications between at least one user station and a system station, the report being generated based on a report format used for uplink reporting by a user station;
receiving an indication that the node for relaying has different buffering capabilities than the user station;
determining the buffering capabilities of the node for relaying based on the buffer information report and the indication; and
controlling communications between the system station and the node for relaying accordingly.

8. A method as claimed in claim 7, wherein the indication comprises an indication that the buffer size of the node for relaying is extended from that of the user equipment and information of the size of the extension.

9. A method as claimed in claim 7, wherein the buffer information report indicates the buffer size of a user equipment and the indication provides a buffer extension factor, the method comprising defining the buffer capabilities of the node for relaying as a function of the buffer size and buffer extension factor.

10. A method as claimed in claim 7, wherein the buffer information report comprises a medium access control element.

11. A method as claimed in claim 7, comprising separate signalling of said indication in a radio resource control message or an admission control message and the buffer information report in a medium access control message.

12. An apparatus comprising:
means for receiving a buffer information report from a node for relaying communications between at least one user station and a system station, the report being generated based on a report format used for uplink reporting by a user station; and
control means for processing an indication that the node for relaying has different buffering capabilities than the user station, for determining the buffering capabilities of the node for relaying based on the received buffer information report and the indication, and for controlling communications between the system station and the node for relaying accordingly.

13. An apparatus, comprising:
at least one processor; and
at least one memory including computer program code
the at least one memory and the computer program code configured to, with the at least one processor, cause the apparatus to perform at least the following:
sending of a buffer information report to a system station from a node for relaying communications between at least one user station and the system station, the report being generated based on a report format used for uplink reporting by a user station; and
sending of an indication to the system station that the node for relaying has different buffering capabilities than the user station.

14. An apparatus as claimed in claim 13, wherein the at least one memory and the computer program code are further configured to, with the at least one processor, cause the apparatus to perform at least the following: process an indication that the buffer size of the node for relaying is extended from that of the user equipment and information of the size of the extension.

15. An apparatus as claimed in claim 13, wherein the at least one memory and the computer program code are further configured to, with the at least one processor, cause the apparatus to perform at least the following: process a buffer information report that indicates the buffer size of a user equipment, and wherein the indication provides a buffer extension factor and the buffer capabilities of the node for relaying are defined as a function of the buffer size and buffer extension factor.

16. An apparatus as claimed in claim 13, wherein the at least one memory and the computer program code are further configured to, with the at least one processor, cause the apparatus to perform at least the following: communicate the indication within the buffer information report.

17. An apparatus as claimed in claim 16, wherein the buffer information report comprises a buffer status report and said indication is included into an extension of the buffer status report.

18. An apparatus, comprising:
at least one processor; and
at least one memory including computer program code
the at least one memory and the computer program code configured to, with the at least one processor, cause the apparatus to perform at least the following:
receiving a buffer information report from a node for relaying communications between at least one user station and a system station, the report being generated based on a report format used for uplink reporting by a user station; and
control means for processing an indication that the node for relaying has different buffering capabilities than the user station, for determining the buffering capabilities of the node for relaying based on the received buffer information report and the indication, and for controlling communications between the system station and the node for relaying accordingly.

19. An apparatus as claimed in claim 18, wherein the at least one memory and the computer program code are further configured to, with the at least one processor, cause the apparatus to perform at least the following: process an indication that the buffer size of the node for relaying is extended from that of the user equipment and information of the size of the extension.

20. An apparatus as claimed in claim 18, wherein the at least one memory and the computer program code are further configured to, with the at least one processor, cause the apparatus to perform at least the following: determine the buffer size of the node for relaying based on an extension factor that has been received earlier or based on a default extension factor.

21. An apparatus as claimed in claim 18, wherein the at least one memory and the computer program code are further configured to, with the at least one processor, cause the apparatus to perform at least the following: communicate the indication within the buffer information report.

22. An apparatus as claimed in claim 18, wherein the buffer information report comprises a buffer status report and said indication is included into an extension of the buffer status report.

23. A computer program product comprising a non-transitory computer-readable storage medium bearing computer program code embodied therein for use with a computer, the computer program code comprising code for performing the method of claim 1.

24. A computer program product comprising a non-transitory computer-readable storage medium bearing computer program code embodied therein for use with a computer, the computer program code comprising code for performing the method of claim 7.

\* \* \* \* \*